United States Patent [19]

Masuda

[11] Patent Number: 4,632,449
[45] Date of Patent: Dec. 30, 1986

[54] SLIDING ROOF FOR VEHICLES
[75] Inventor: Mitsuyoshi Masuda, Nagoya, Japan
[73] Assignee: Aisin Seiki Kabushika Kaisha, Japan
[21] Appl. No.: 819,000
[22] Filed: Jan. 13, 1986

Related U.S. Application Data

[63] Continuation of Ser. No. 547,251, Oct. 31, 1983, abandoned.

[30] Foreign Application Priority Data

Nov. 1, 1982 [JP] Japan .......................... 57-165877[U]

[51] Int. Cl.⁴ .......................... B60J 7/053; B60J 7/19; B60J 7/05
[52] U.S. Cl. .................................. 296/222; 296/221; 296/224
[58] Field of Search .......................... 296/216, 221–224

[56] References Cited

U.S. PATENT DOCUMENTS 4,245,864 1/1981 Shitanoki .......................... 296/222
4,350,385 9/1982 Schatzler .......................... 296/222
4,420,184 12/1983 Kaltz .............................. 296/221

FOREIGN PATENT DOCUMENTS 1346506 2/1974 United Kingdom .

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A sliding roof for closing an opening in the roof of a vehicle, the sliding roof including a panel for insertion into the opening, a bracket attached to each side of the panel, a front shoe pivotably attached to the front end of each bracket, a guide slot affixed to each bracket, the guide slots each including a horizontal portion and an inclined portion rising rearwardly therefrom, a pair of guide links each pivotably movable at its rearward end on a rear shoe and having at its upper forward end a guide pin engaging one of said guide slots and at its lower forward end a roller pin, a pair of engaging pins, each affixed to an individual bracket, a pair of guide rails, one on each side of said sliding roof for guiding the related front shoe, rear shoe and engaging pin, a stationary block disposed within each guide rail, each block including a pair of horizontally displaced inclined grooves, one in the path of movement of the corresponding engaging pin and the other in the path of movement of the corresponding roller pin, and a pair of drive cables for imparting movement to the rear shoes.

2 Claims, 11 Drawing Figures

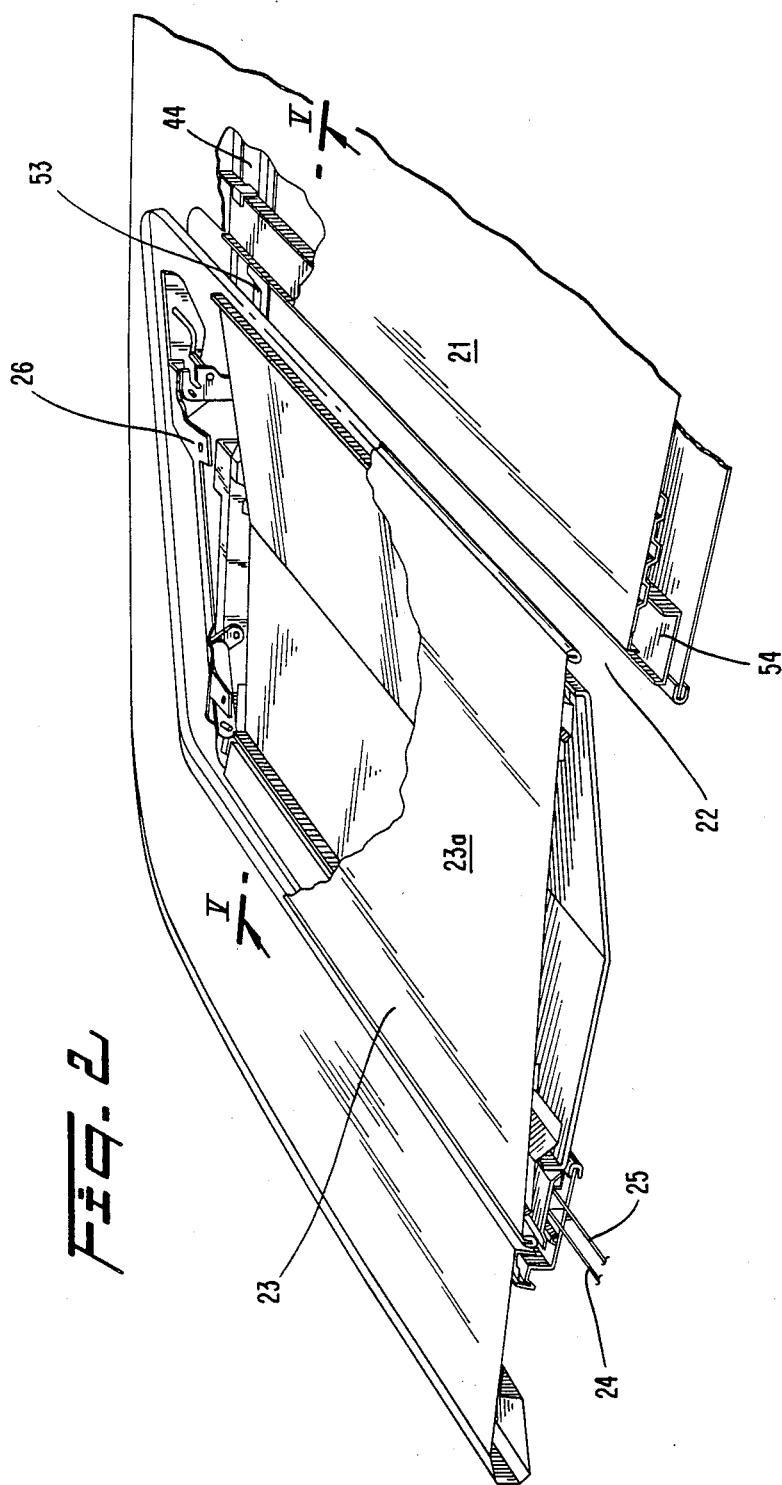

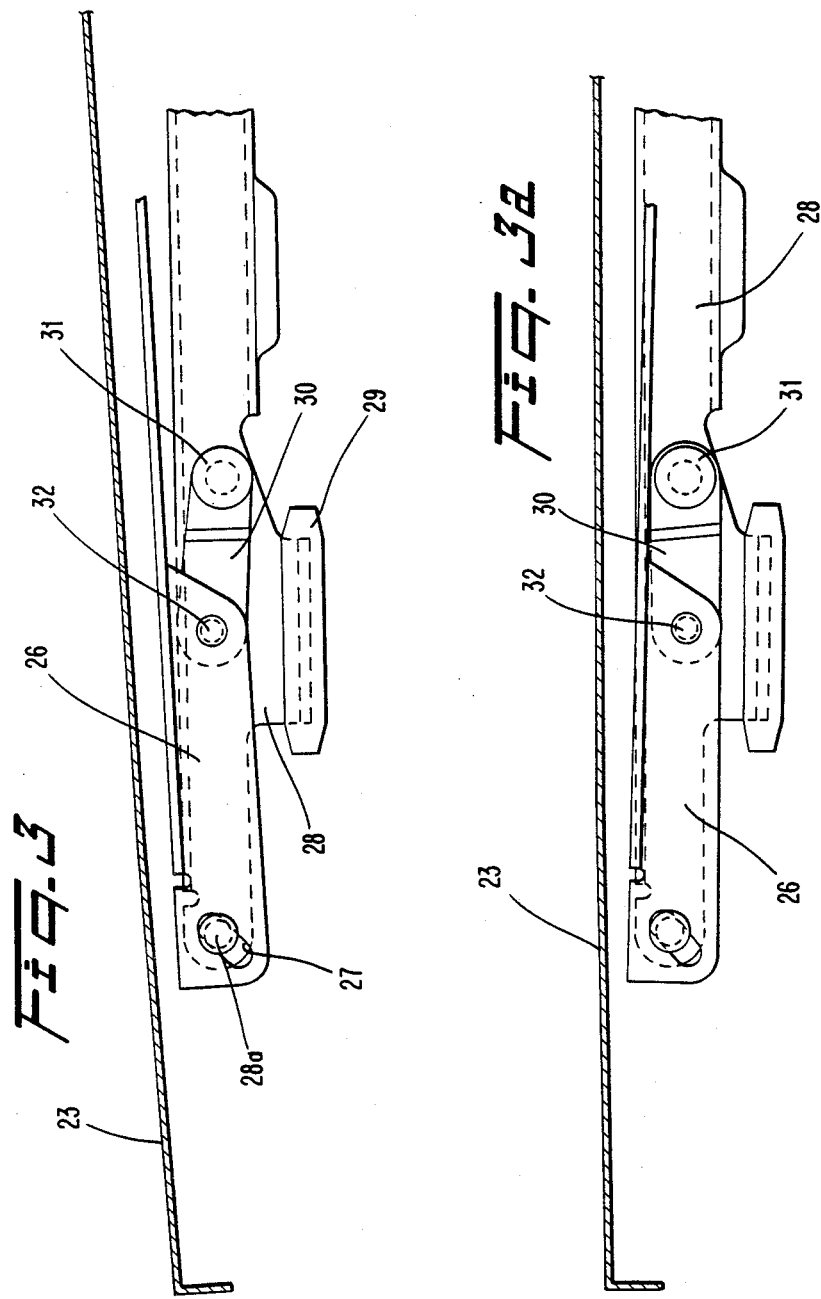

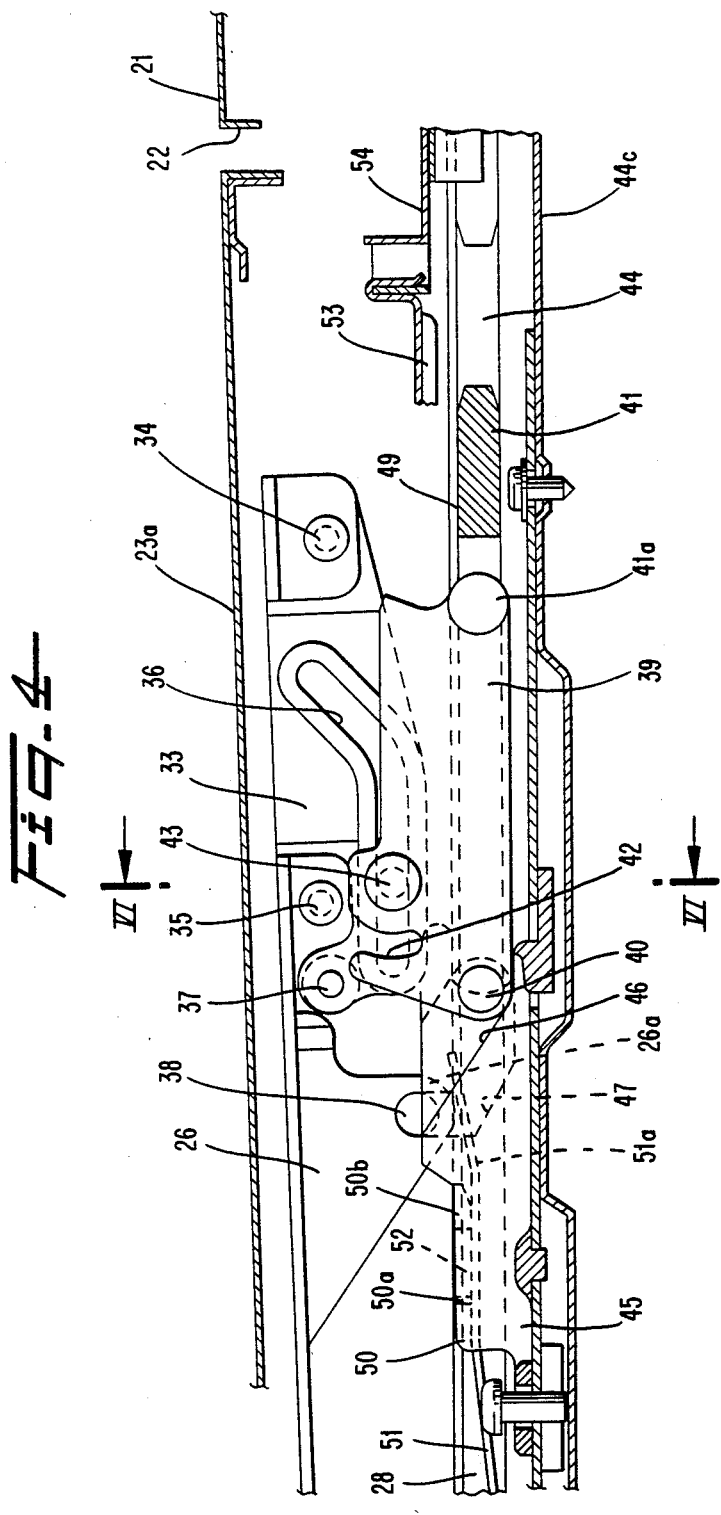

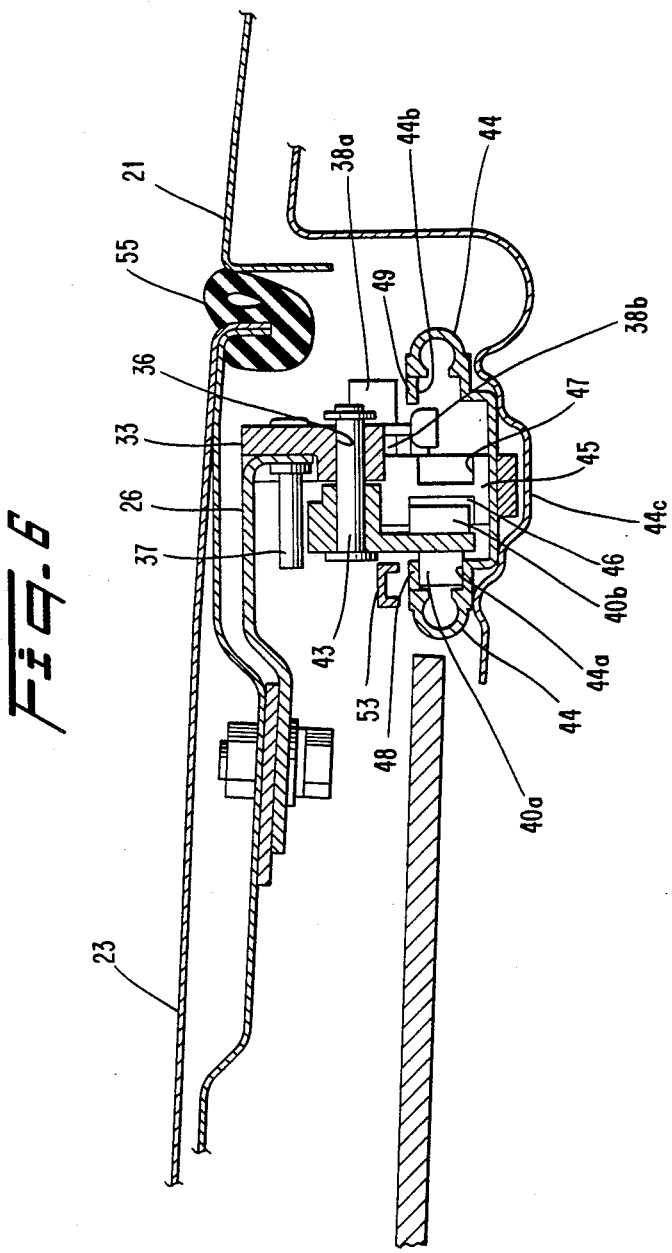

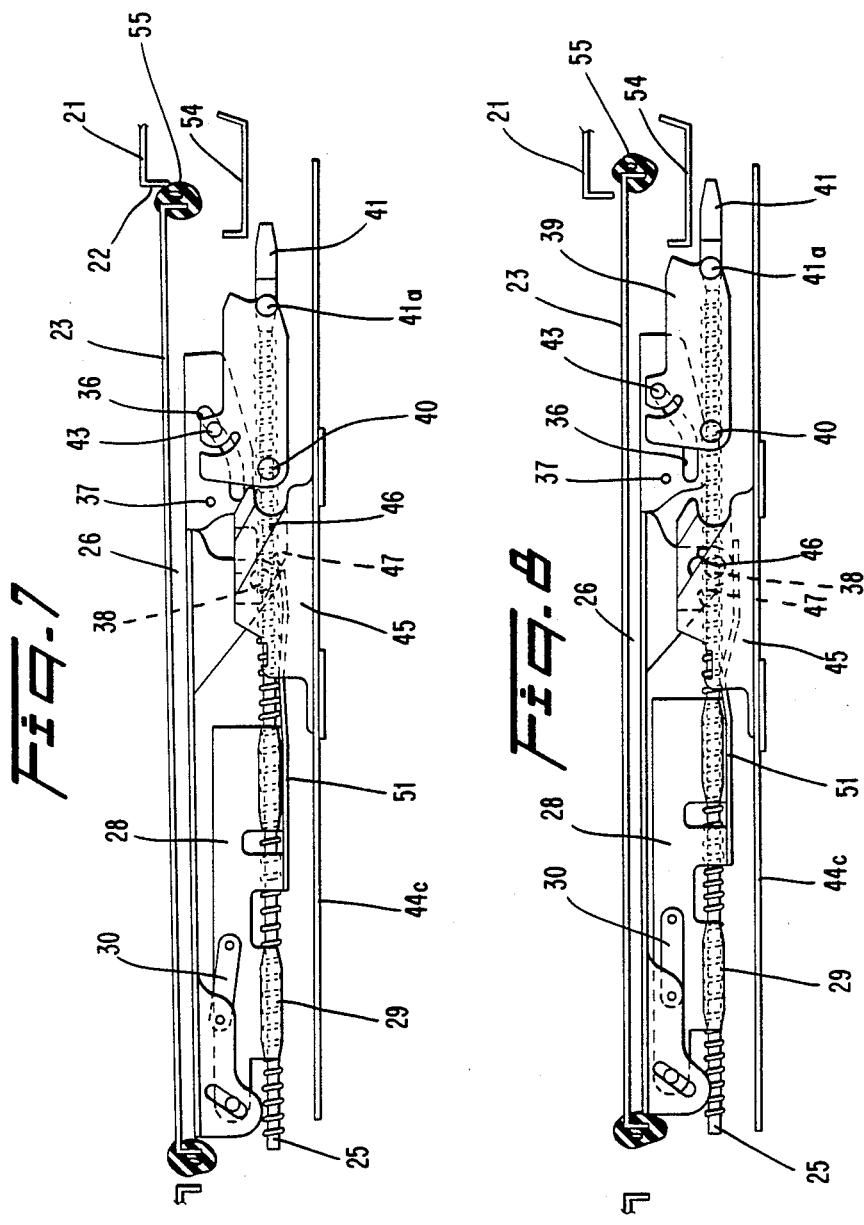

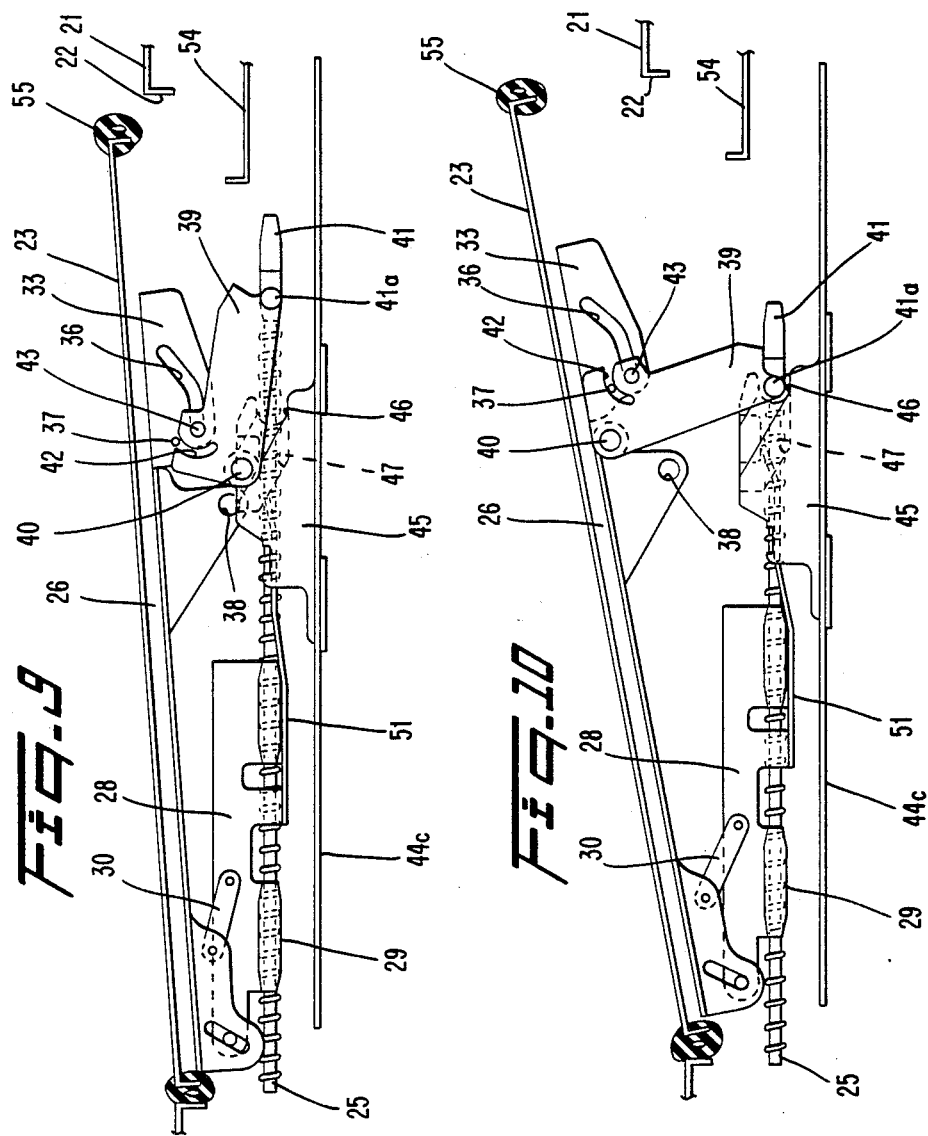

SLIDING ROOF FOR VEHICLES

This application is a continuation of application Ser. No. 547,251, filed Oct. 31, 1983, now abandoned.

BACKGROUND OF THE INVENTION

1. Field of the Invention

The present invention relates to a sliding panel for a vehicle roof, and more particularly to a vehicle sliding roof panel employing a member for horizontally and vertically positioning the panel.

2. Description of the Prior Art

In a conventional sliding roof panel for a vehicle, as shown in FIG. 1, the roof panel 2 is mounted so as to open and close an opening 1a in the roof 1 providing a so-called sun roof. The sliding panel is normally opened and closed by a driving apparatus mounted in a portion of the roof located at the front of the vehicle.

In such a type of sliding roof panel, a frame for the panel 2 includes a front bracket 3 and a rear bracket 4, the front bracket including a guide roller 3a. Rear bracket 4 includes guide slot 5 having a horizontal portion and an inclined portion angled upwardly from the rear end of the horizontal portion. A link 6 has a guide pin 7 affixed thereto and inserted into guide slot 5. In addition, a rear guide roller 8 is attached to link 6. A guide rail 9, which is disposed in roof 1 and extends under the opening 1a, allows guide rollers 3a, 8, to be inserted therein. Thereby, sliding roof panel 2 can slide rearward and forward along guide rail 9 by means of conventional drive cables (not shown).

FIG. 1 depicts conventional roof panel 2 in the closed position. The opening 1a is exposed when panel 2 is actuated so as to be open. When sliding roof panel 2 is being opened, by being drawn toward the rear of the vehicle, guide pin 7 of link 6 is moved toward the upper end of the inclined portion of guide slot 5 of bracket 4. Accordingly, the rear section of sliding roof 2 is forced to a lower position than depicted in FIG. 1 and is at a level approximately equivalent to the midsection of front guide roller 3a. The sliding roof therefore can be drawn under roof 1 by further horizontal rearward displacement of link 6.

In order to close sliding roof panel 2, link 6 is drawn forwardly, i.e., to the left in FIG. 1, until the front end of the panel contacts the front edge of the opening 1a. When the horizontal movement of panel 2 is stopped, link 6 continues forwardly forcing guide pin 7 from the inclined portion of guide slot 5 to the horizontal portion. Since the vertical disposition of guide pin 7 remains constant, the rear portion of sliding roof 2 is raised above the center of rear guide roller 3, closing the opening 1a.

In the prior art structure, opening the sun roof, as the guide pin 7 is translated from a horizontal to an inclined path, forcing the roof panel downwardly, an increased load is suddenly imposed on the drive cables increasing their fatigue.

SUMMARY OF THE INVENTION

One object of the present invention is to provide an improved sliding roof panel for vehicles which obviates the aforementioned drawback of the conventional sun roof.

A further object of the present invention is to provide an improved sliding roof panel for vehicles which can be operated with a greater degree of reliability and ease of movement.

A still further object of the present invention is to provide an improved sliding roof panel for vehicles which can be easily assembled from a minimum number of parts and therefore can be easily repaired.

To achieve the foregoing objects, and, in accordance with the invention as embodied and broadly described herein, a sliding roof for opening and closing an opening in the roof of a vehicle includes a roof panel having a bracket at each side of the panel and a sliding assembly attached to the bracket, a front shoe pivotably supported on the front end of the bracket, a plate affixed to the rear portion of the bracket, a guide slot on the rear portion of the plate, the guide slot having a horizontal portion and an inclined portion, a rear shoe privotally connected to the plate, a guide link having a a roller pin and a pivot pin, the guide link rotatably supporting roller pin at the front end of the guide link and rotatably supporting the pivot pin connecting the rear shoe at the rear end of the guide link, a guide pin formed on the guide link and slidably engaging the guide slot, an engaging pin located near the rear end of the bracket, a guide rail disposed beneath the roof of the vehicle for guiding the front shoe, the rear shoe, and the engaging pin, drive cable means to impart movement to the rear shoe along the guide rail, a stationary block positioned on the guide rail and having a pair of horizontally displaced inclined grooves, one in the path of the engaging pin and one in the path of the roller pin, and means provided on the panel for engaging the block beyond a predetermined position.

BRIEF DESCRIPTION OF THE DRAWINGS

The invention will be described with additional specificity and detail through the use of the accompanying drawings in which:

FIG. 2 is a perspective view partially broken away showing a sliding roof for vehicles embodying the present invention;

FIG. 3 is a partial section view of the front portion of the assembled state of the sliding roof of FIG. 2;

FIG. 3a is another partial section view of the front portion of the assembled state of the sliding roof of FIG. 2;

FIG. 4 is a detailed sectional view of the rear portion of the sliding roof of FIG. 2;

FIG. 6 is a partial section view taken along line VI—VI of FIG. 4;

FIG. 7 is a sectional view of the first stage of opening the sliding roof by one method of the invention;

FIG. 8 is a sectional view of a later stage of opening the sliding roof of the method of FIG. 7;

FIG. 9 is a sectional view of an early stage of opening the sliding roof by a second method of the invention; and FIG. 10 is a later stage of opening the sliding roof of the method of FIG. 9.

DETAILED DESCRIPTION OF THE PREFERRED EMBODIMENT

Figure 1:
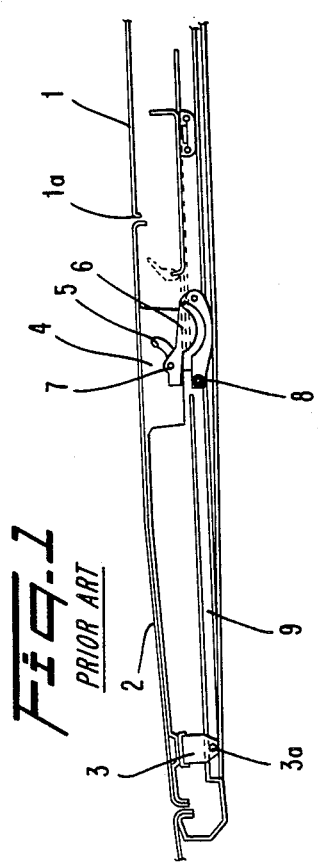
FIG. 1 is a section view showing a conventional sliding roof.

Referring now to FIG. 2, reference numeral 23 depicts an opened, sliding sun roof of the invention, inserted within vehicle roof 21. Sliding roof 23 is assembled having a pair of brackets 26 oppositely disposed on the underside of roof panel 23a. (In FIG. 2 only one bracket is shown.) The sliding roof 23 is actuated by a pair of drive cables 24 and 25 which are connected to brackets 26 and cause opening 22 to be opened and closed by the resultant sliding or standing movement of the sliding roof, as known in the art.

Viewing FIGS. 3, and 3a together each of the brackets 26 includes an elongated, upward sloping aperture 27 formed in the front section of the bracket. A front guide 28 has a pin 28a on a side thereof slidably engaging aperture 27, and a front shoe 29 depending therefrom. A frontal link 30 is pivotably supported on each of front guide 28 and bracket 26 by pins 31 and 32, respectively. The displacement of frontal link 30 about pins 31 and 32 resulting from actuation of sliding roof 23 to the closed position, or further wherein the panel 13a extends above the roof 21, causes the frontal link to be sloped downward toward the rear of the vehicle.

Figure 5:
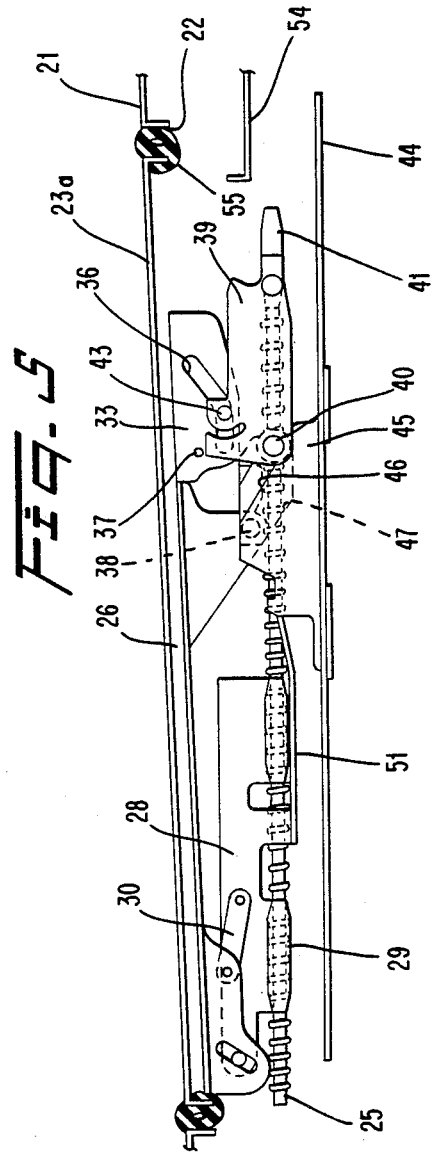
FIG. 5 is a sectional view taken along line V—V of FIG. 2 showing the closed state of the sliding roof.

Viewing FIGS. 4 and 5 together, bracket 26 also includes toward the rear end thereof a downwardly disposed bracket section 26a having, toward the lower end and on the same side thereof as the pin 28a, an engaging pin 38. A plate 33 is affixed to the rear portion of bracket 26 by a pair of attaching pins 34 and 35. Plate 33 includes a guide slot 36 having a forward horizontal section and a rear section which inclines rearwardly upward from the horizontal section. A tilt pin 37 is positioned at the forward end of plate 33.

Plate 33 is connected to a link 39 by means of a guide pin 43 mounted at the upper end of link 39 which engages guide slot 36. Link 39 also includes at its forward end a recessed groove 42 for engaging tilt pin 37. The groove 42 is formed with opposing walls as arcs of a circle having as its center a point at the center of the width of the horizontal portion of the slot 36. In addition, a roller pin 40 and a rear show 41 are pivotably supported by front and rear end portions, respectively, of link 39, the link being pivotably but firmly secured to the rear shoe 41 by pin 41a.

As shown in FIG. 5, a drive cable 25 is firmly secured to rear shoe 41. Accordingly, rearward and forward movement is transmitted to roof panel 23a by drive cables 24 (FIG. 2 only) and 25 through brackets 26 on each side of the vehicle by rear shoes 41, which in turn cause guide pin 43 of guide link 39 to move along guide slot 36. The brackets 26 also transmit movement of the rear shoes 41, to front guides 28 and front shoes 29.

As shown in FIG. 4, rear shoe 41 engages a guide rail 44 which extends along both sides of the vehicle beneath sliding roof 23 as shown in FIG. 6. Though not shown, the front shoes 29 are also supported within each guide rail 44. Each guide rail 44 comprises a rail groove 44a toward the vehicle interior and a rail groove 44b toward the vehicle exterior. A leg portion 40a of roller pin 40 engages rail groove 44a of guide rail 44 and leg portion 38a of engaging pin 38 engages rail groove 44b of guide rail 44. The guide rail 44 is supported on a base frame 44C, shown in FIGS. 6–10.

Further, a block 45 is rigidly mounted within each guide rail 44, having a pair of horizontally displaced inclined grooves 46, 47, as viewed together in FIGS 4, 5, 6 and 7. The inclined grooves 46 lie in the path of head sections 40b of roller pins 40 on guide links 39 and the inclined grooves 47 lie in the path of guide head sections 38b of engaging pins 38 as the rear shoes 41 are drawn toward the front of the vehicle by the guide cables 24, 25. Each guide rail 44 also includes flanges 48, 49 which form laterally recessed sections adjacent blocks 45. This arrangement allows engaging pins 38 and roller pins 40 to rise from rail grooves 44a and 44b and follow along inclined grooves 46, 47 by means of the forward movement of guide links 39. Therefore, the forward end of link 39 is raised initially when roller pins 40 contact inclined grooves 46 to raise the panel 23a into the closed position and by the engagement of pins 38 with inclined grooves 47, as shown in FIGS. 8, 7, 5, 9 and 10 in that order and described in detail hereafter.

Flanges 50, 50b having a rectangular opening 50a are formed on an upper end of the block 45. A stopper 52 is disposed at other end side of a plate spring 51 which is fixed to the front guide at one end thereof. The stopper 52 is engaged with the opening 50a upon the closing and upstanding states of the sliding roof 23. Thereby, the forward movement of the front guide 28 is blocked. One end 51a of the plate spring 51 is depressed by a lower end 26a of the bracket 26 and the plate spring 51 is slidable within the guide rail 44 upon the sliding initiation of the sliding roof 23. Accordingly, the plate spring 51 which is depressed by the lower end 26a of the bracket 26, is upwardly moved concurrently with the rising movement of the engaging pin 38 wihtin the inclined groove 47 of the block 45 and is engaged with the opening 50a of the block 45 (FIG. 4).

As shown in FIGS. 2 and 4, an arm 53 extends from front guide 28 beyond rear shoe 41. A gutter and eave member 54, which always slides with sliding roof 23, is connected to the rear section of arm 53 and rain falling from the rear of panel 23a is caught by the eave member 54.

The sliding roof 23 of the invention normally closes the opening 22 as shown in FIG. 5. The sliding roof 23 can be opened in either of two different ways. In the first method, the panel 23a is lowered and retracted under the vehicle roof 21 as shown in FIGS. 7 and 8. In the second method, the rear portion of the panel 23a is raised, in effect pivoting about the front edge of the panel, as shown in FIGS. 9 and 10, forming a ventilation opening between the rear edge of the panel and the rear edge of the opening 22.

In the first method, the drive cables 24, 25 are actuated to thrust the rear shoes 41 rearwardly, pulling the guide links 39 rearwardly. The guide pins 43 are also drawn rearwardly from the horizontal portion to the inclined portion of the guide slots 36. The brackets 26 are pulled downwardly as the guide pins move rearwardly along the inclined portion of the guide slots 36. Meantime, the engaging pins 38 are pulled downwardly and rearwardly along the inclined grooves 47 of the blocks 45 until the pins 38 are drawn into the guide rails 44.

As a result, the sliding roof 23 can be inserted into the rearward lower portion of the roof 21 and the roof opening is opened by the sliding movement of the sliding roof 23.

Conversely, the roof opening 22 is closed in the first method with the forward and rising movement of the sliding roof 23. The load on the drive cables 24, 25 is thereby reduced since it is not necessary for the sliding roof 23 to rise suddenly.

In the second method, the rear portion of the panel 23a is raised by drawing the rear shoes 41 further forward from the position shown in FIG. 5. When the drive cable 24, 25 are actuated and the rear shoes 41 are moved forwardly from the closed position as shown in FIG. 5, each head section 40b of roller pins 40 on the guide link 39 is drawn upwardly along the inclined groove 46 of the block 45 and the front portion of the guide link 39 is raised and rotated about the pins 41a while it moves forwardly (FIG. 9). Accordingly, the recessed grooves 42 of the guide link 39 engage the tilt pins 37 on the plates 33. By further forward movement of the rear shoe 41, the front portion of the guide link 39 are further raised with rotation about the pins 41a. The rear edge of the sliding roof 22 is thereby moved upwardly and stands above the line of the roof 21, thus opening the sliding roof by the second method as shown in FIG. 10.

As previously stated, the sliding roof 23 is provided with front shoes 29 at the front end and with the bracket 26 having the guide slots 36 at the rear end. Accordingly, these members can be assembled with the vehicle before the panel 23a. Panel 23a can then be attached to the bracket 26 in the closed position of the sliding roof 23. As a result, the panel 23a can be always assembled with the bracket 26 with a proper closing position to the roof opening 22.

Since the actuation of the panel 23a is transmitted via brackets 26, a seal member 55 is fixed to the roof opening 22 in a uniform bent state thereof and the panel 23a can be assembled to the bracket 26 in the closed state of FIG. 5, after the panel 23a is assembled to the roof 21.

By the foregoing there has been disclosed a preferred form of sliding roof for vehicles constructed in accordance with the present invention. It will be appreciated that various additions, substitutions, modifications and omissions may be made thereto without departing from the spirit of the invention.

What is claimed is:

1. A sliding roof for opening and closing an opening in the roof of a vehicle, the sliding roof having a panel and a sliding assembly attached to each side of the panel, the sliding assembly comprising:
   a bracket depending from the panel;
   a front shoe pivotally supported on a front end of said bracket;
   a plate affixed to a rear portion of said bracket;
   a guide slot formed on a rear end of said plate, said guide slot having a horizontal portion and an inclined portion;
   a rear shoe pivotally connected to said plate;
   a guide link having a roller pin and a pivot pin, said guide link rotatably supporting said roller pin at the front end of said guide link and supporting said pivot pin at the rear of said guide link, said pivot pin connecting said rear shoe to the rear end of the said guide link allowing said guide link to pivot relative to said rear shoe;
   a guide pin formed on said guide link and slidably engaging said guide slot;
   an engaging pin located near the rear end of said bracket;
   a guide rail disposed beneath the roof of the vehicle for guiding said front shoe, said rear shoe and said engaging pin;
   drive cable means to impart movement to said rear shoe along said guide rail; and
   a stationary block positioned on said guide rail and having a pair of horizontally displaced inclined grooves, one in the path of said engaging pin and the remaining one in the path of said roller pin.

2. A sliding roof for opening and closing an opening in the roof of a vehicle, the sliding roof having a panel and a sliding assembly attached to each side of the panel, the sliding assembly comprising:
   a bracket depending from the panel;
   a front shoe pivotally supported on a front end of said bracket;
   a plate affixed to a rear portion of said bracket;
   a guide slot formed on a rear end of said plate, said guide slot having a horizontal portion and an inclined portion;
   a rear shoe pivotally connected to said plate;
   a guide link having a roller pin and a pivot pin, said guide link rotatably supporting said roller pin at the front end of said guide link and supporting said pivot pin at the rear of said guide link, said pivot pin connecting said rear shoe to the rear end of said guide link allowing said guide link to pivot relative to said rear shoe;
   a guide pin formed on said guide link and slidably engaging said guide slot;
   an engaging pin located near the rear end of said bracket;
   a guide rail disposed beneath the roof of the vehicle for guiding said front shoe, said rear shoe and said engaging pin;
   drive cable means to impart movement to said rear shoe along said guide rail;
   a stationary block positioned on said guide rail and having a pair of horizontally displaced inclined grooves, one in the path of said engaging pin and the remaining one in the path of said roller pin; and
   means provided on the panel for engaging said block to prevent continued forward movement of said panel beyond a predetermined position.

* * * * *